United States Patent
Yue

(10) Patent No.: US 9,487,071 B1
(45) Date of Patent: Nov. 8, 2016

(54) FOLDABLE TONNEAU COVER FOR PICK-UP TRUCK AND CLAMP STORAGE MECHANISM THEREOF

(71) Applicant: CYC ENGINEERING, INC., Fremont, CA (US)

(72) Inventor: Shiawdar Shaun Yue, Cupertinoo, CA (US)

(73) Assignee: CYC ENGINEERING, INC., Fremont, CA (US)

( * ) Notice: Subject to any disclaimer, the term of this patent is extended or adjusted under 35 U.S.C. 154(b) by 8 days.

(21) Appl. No.: 14/798,487

(22) Filed: Jul. 14, 2015

(51) Int. Cl.
| | | |
|---|---|---|
| *B60J 7/19* | (2006.01) | |
| *B60J 7/14* | (2006.01) | |
| *B60P 7/02* | (2006.01) | |

(52) U.S. Cl.
CPC ............... *B60J 7/198* (2013.01); *B60J 7/141* (2013.01); *B60P 7/02* (2013.01)

(58) Field of Classification Search
CPC ........ B60J 7/1607; B60J 7/141; B60J 7/198; B60J 7/104
USPC ............ 296/100.01, 100.02, 100.07–100.09, 296/100.16
See application file for complete search history.

(56) References Cited

U.S. PATENT DOCUMENTS

| | | | |
|---|---|---|---|
| 5,636,893 A * | 6/1997 | Wheatley ................. | B60J 7/141 16/354 |
| 7,188,888 B2 | 3/2007 | Wheatley et al. | |
| 7,905,536 B2 | 3/2011 | Yue | |
| 8,366,173 B2 * | 2/2013 | Xu ............................ | B60J 7/104 248/229.12 |
| 8,511,736 B2 * | 8/2013 | Williamson ........... | B60J 7/1607 224/558 |
| 8,632,114 B2 | 1/2014 | Yue | |
| 8,807,625 B2 * | 8/2014 | Garska .................... | B23P 11/00 296/100.07 |
| 8,960,765 B2 * | 2/2015 | Facchinello ............. | B60J 7/141 296/100.06 |
| 9,039,066 B1 | 5/2015 | Yue | |
| 2006/0267370 A1 * | 11/2006 | Wheatley ................. | B60J 7/104 296/100.15 |
| 2007/0108792 A1 * | 5/2007 | Weldy ........................ | B60J 7/08 296/100.09 |
| 2014/0152046 A1 * | 6/2014 | Facchinello ............. | B60J 7/141 296/100.06 |

* cited by examiner

*Primary Examiner* — Gregory Blankenship
(74) *Attorney, Agent, or Firm* — Mark M. Friedman

(57) ABSTRACT

A foldable tonneau cover for a pick-up truck is disclosed and has at least one clamp storage mechanism. Each of the clamp storage mechanism is provided with a cushion member mounted on a lower rigid cover of a frame section and over a distal end of a track rail. The cushion member has a storage notch for at least partially receiving a handle of a clamp assembly when the clamp assembly is shifted into a stored position. In the stored position, the handle is inclined in relation to the lower rigid cover, and the handle is located outside the track of the track rail. Thus, the convenience to manually operate the handle can be enhanced, the vibration during the pick-up truck is moving can be absorbed, the handle can be tightly positioned in the storage notch, and the entire strength of the lower rigid cover can be ensured.

20 Claims, 15 Drawing Sheets

FOLDABLE TONNEAU COVER FOR PICK-UP TRUCK AND CLAMP STORAGE MECHANISM THEREOF

FIELD OF THE INVENTION

The present invention relates to a foldable tonneau cover, and more particularly to a foldable tonneau cover for a pick-up truck having a clamp storage mechanism.

BACKGROUND OF THE INVENTION

A traditional pick-up truck has a cargo box used to carry various cargos. Generally, the cargo box is covered by a tonneau cover which is releasably clamped to, and extended above, the cargo box, so as to protect the carried cargo from adverse weather and improve the aesthetic appearance of the pick-up truck. Tonneau covers can be classified into hard-top type and soft-top type, wherein the hard-top type tonneau cover has a hard top made of rigid material, such as metal, fiberglass or the like, while the soft-top type tonneau cover has a soft top made of flexible material, such as canvas, vinyl plastic or a weather-resistant fabric. Moreover, the tonneau cover can be designed to provide a foldable function to help a user to conveniently extend or store the tonneau cover.

Referring now to FIGS. 1, 2, and 3, schematic views of a traditional hard-top type foldable tonneau cover system for a pick-up truck are illustrated, wherein a tonneau cover system 10 is used to cover a cargo box 21 of a pick-up truck 20, and the tonneau cover system 10 comprises a plurality of frame sections 11, 12, and 13, a plurality of hinges 14, a plurality of rigid cover portions 15 and a plurality of clamp assemblies 16. The number of the rigid cover portions 15 are corresponding to that of the frame sections 11-13 (such as three). The rigid cover portions 15 is made of rigid material, and can be suitably fixed on the corresponding frame sections 11-13. Each of the frame sections 11-13 is constructed by a plurality of frame members. One of the frame sections 11 or 13 can be pivotally connected to another adjacent frame section 12 through two or more of the hinges 14, so that all of the frame sections 11-13 can be adjusted to an extended position or a folded position. The clamp assemblies 16 are generally installed on the lower surfaces of the frontmost and rearmost frame sections 11, 13.

When the frame sections 11 are in the extended position as shown in FIG. 2, the frame sections 11-13 are horizontally extended on the two side walls 22 and a tailgate 23 of the cargo box 21, and fixed thereon by the clamp assemblies 16, so as to cover an inner space of the cargo box 21. When the frame sections 11-13 are converted into the folded position as shown in FIG. 3, the frame sections 11-13 are folded and stacked on a front end of the two side walls 22, so as to expose the inner space of the cargo box 21 for placing or taking cargo.

In the tonneau cover system 10, each of the clamp assemblies 16 mainly comprises a clamp track 161, a block member 162, a handle 163, a rod member 164 and a latch member 165, wherein a proximate end of the clamp track 161 is coupled to a side edge of the frame section 13, and a distal end of the clamp track 161 is supported by a support rail 166 which has two opposite ends coupled to other side edges of the frame section 13; the clamp track 161 has a channel 161a and a pocket 161b located at a distal end of the channel 161a; the pocket 161b having an opening 161c which is closed by a cover plate 161d; the block member 162 is slidably disposed in the channel 161a; the handle 163 and the rod member is pivotally connected to the block member 162, respectively; and the latch member 165 is movably coupled to the rod member 164 and moveable between a clamped position for operatively engaging the side wall 22 of the cargo box 21 and a released position for spacing the latch member 165 from the side wall 22. When the clamp assembly 16 is in a stored position, the handle 163 and the rod member 164 are positioned in the channel 161a, and the distal end of the handle 163 is further extended and retained in the pocket 161b.

However, there are still some problems existing in the actual use of the structure of the traditional clamp assembly 16, as follows: (1) because the channel 161a only has a limited width, it is difficult and inconvenient for a user to manually operate and pull up the handle 163 and the rod member 164 positioned in the channel 161a during changing the stored position back to the released position and the clamped position; (2) because the channel 161a and the pocket 161b lack tightly positioning structure to ensure the handle 163 and the rod member 164 be tightly positioned therein, there is a risk that the handle 163 and the rod member 164 might finally move out of the channel 161a and the pocket 161b of the rearmost frame section 11 due to vibrations of the moving truck when the frame sections 11-13 are in the folded position and stacked on the front end of the cargo box 21; (3) the clamp track 161 must have a sufficient length to form a channel 161a and a pocket 161b for receiving the handle 163 and the rod member 164, but the longer clamp track 161 might negatively affect the entire strength of the rigid cover portions 15 on the lower surface of the frame sections 11,13.

As a result, it is necessary to provide a clamp storage mechanism to solve the problems existing in the conventional foldable tonneau cover, as described above.

SUMMARY OF THE INVENTION

A primary object of the present invention is to provide a foldable tonneau cover for a pick-up truck, which is provided with at least one clamp storage mechanism each having a cushion member mounted on a lower rigid cover of a frame section and over a distal end of a track rail, wherein the cushion member has a storage notch for at least partially receiving a handle of a clamp assembly when the clamp assembly is shifted into a stored position. In the stored position, the handle is inclined in relation to the lower rigid cover, and the handle is located outside the track of the track rail. Thus, the convenience to manually operate the handle can be enhanced, the vibration during the pick-up truck is moving can be absorbed, the handle can be tightly positioned in the storage notch, and the entire strength of the lower rigid cover can be ensured.

To achieve the above object, the present invention provides a foldable tonneau cover for a pick-up truck, which comprises:

a frame section having a plurality of frame members commonly supporting an upper rigid cover and a lower rigid cover;

a pair of track rails each defining a track, wherein one of the track rails has a proximate end coupled to one of the frame members and a distal end supported by one end of an interconnection rail which has the other end coupled to a distal end of the other of the track rails; and a pair of clamp assemblies slidably installed along the track rails, respectively, and each of the clamp assemblies comprising:

a block member slidably received in the track of the corresponding track rail, a rod member rotatably coupled to the block member, a latch member slidably coupled to the rod member and switched between a clamped position for operatively engaging with a side wall of a cargo box of the pick-up truck and a released position for releasing from the side wall of the cargo box; and a handle rotatably coupled to the rod member for controlling the latch member to switch between the clamped position and the released position;

a pair of cushion members mounted on the lower rigid cover of the frame section and over the distal ends of the track rails, respectively, and each having a storage notch for positioning the handle when the clamp assembly is shifted into a stored position;

wherein when the clamp assembly is in the stored position, the handle is inclined in relation to the lower rigid cover of the frame section; the handle is substantially located outside the track of the track rail; and the height of the latch member in relation to the lower rigid cover is lower than or equal to the height of the cushion member in relation to the lower rigid cover.

In one embodiment of the present invention, the cushion member is made of foam rubber.

In one embodiment of the present invention, the foam rubber is ethylene vinyl acetate (EVA) copolymer.

In one embodiment of the present invention, the storage notch of the cushion member has an inverted T-shape cross-section or a dovetailed cross-section.

In one embodiment of the present invention, the cushion member has a fastening belt having a first end mounted on one side of the cushion member and a second end spanning across the storage notch to engage with a fastening member mounted on the other side of the cushion member, so that the handle is retained in the storage notch.

In one embodiment of the present invention, the second end of the fastening belt is provided with one of a hook fastener and a loop fastener, and the fastening member is the other thereof.

In one embodiment of the present invention, the fastening member is one of a male snap button and a female snap button, and the fastening member is the other thereof.

In one embodiment of the present invention, the handle is a lever or a turnbutton.

In one embodiment of the present invention, the cushion member has an extension portion extended therefrom to insert into the distal end of the track of the track rail.

In one embodiment of the present invention, the extension portion has an inclined surface and an indentation formed in the inclined surface, wherein the latch member is partially received and retained in the indentation when the clamp assembly is shifted into the stored position.

In one embodiment of the present invention, the length of the track of the track rail is smaller than the length from a distal end of the handle to a pivotal end of the rod member pivotally connected to the block member.

In one embodiment of the present invention, the height of the cushion member in relation to the lower rigid cover is substantially equal to the gap between the frame section and a frontmost frame section of the foldable tonneau cover when the foldable tonneau cover is in a folded position.

Furthermore, the present invention provides a clamp storage mechanism of a foldable tonneau cover for a pick-up truck, which comprises:

a cushion member mounted on a lower rigid cover of a frame section of the foldable tonneau cover and over a distal end of a track rail in the frame section;

wherein the cushion member has a storage notch for positioning a handle of a clamp assembly slidably installed along a track of the track rail when the clamp assembly is shifted into a stored position.

In one embodiment of the present invention, the cushion member is made of foam rubber.

In one embodiment of the present invention, the storage notch of the cushion member has an inverted T-shape cross-section or a dovetailed cross-section.

In one embodiment of the present invention, the cushion member has a fastening belt having a first end mounted on one side of the cushion member and a second end spanning across the storage notch to engage with a fastening member mounted on the other side of the cushion member, so that the handle is retained in the storage notch.

In one embodiment of the present invention, the second end of the fastening belt is provided with one of a hook fastener and a loop fastener, and the fastening member is the other thereof.

In one embodiment of the present invention, the fastening member is one of a male snap button and a female snap button, and the fastening member is the other thereof.

In one embodiment of the present invention, the cushion member has an extension portion extended therefrom to insert into the distal end of the track of the track rail.

In one embodiment of the present invention, the extension portion has an inclined surface and an indentation formed in the inclined surface, wherein the latch member is partially received and retained in the indentation when the clamp assembly is shifted into the stored position.

DETAILED DESCRIPTION OF THE PREFERRED EMBODIMENTS

The structure and the technical means adopted by the present invention to achieve the above and other objects can be best understood by referring to the following detailed description of the preferred embodiments and the accompanying drawings. Furthermore, directional terms described by the present invention, such as upper, lower, front, back, left, right, inner, outer, side, longitudinal/vertical, transverse/horizontal, etc., are only directions by referring to the accompanying drawings, and thus the used directional terms are used to describe and understand the present invention, but the present invention is not limited thereto.

Figure 1:
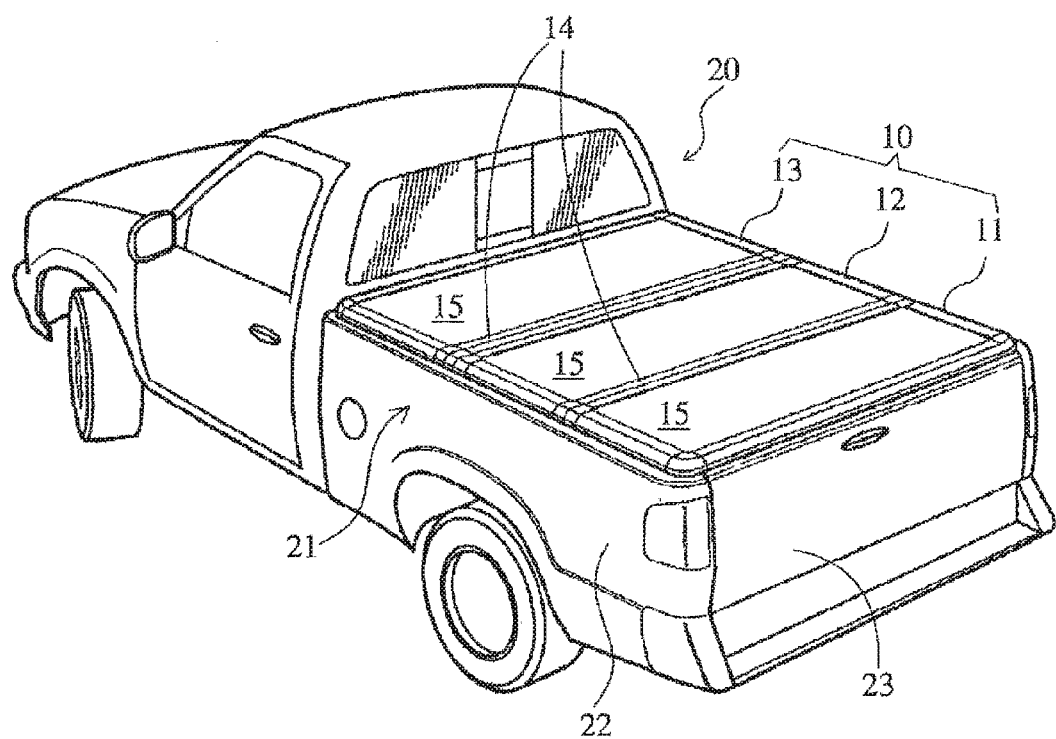
FIG. 1 is a perspective view of a traditional hard-top type foldable tonneau cover system of a pick-up truck.
Figure 2:
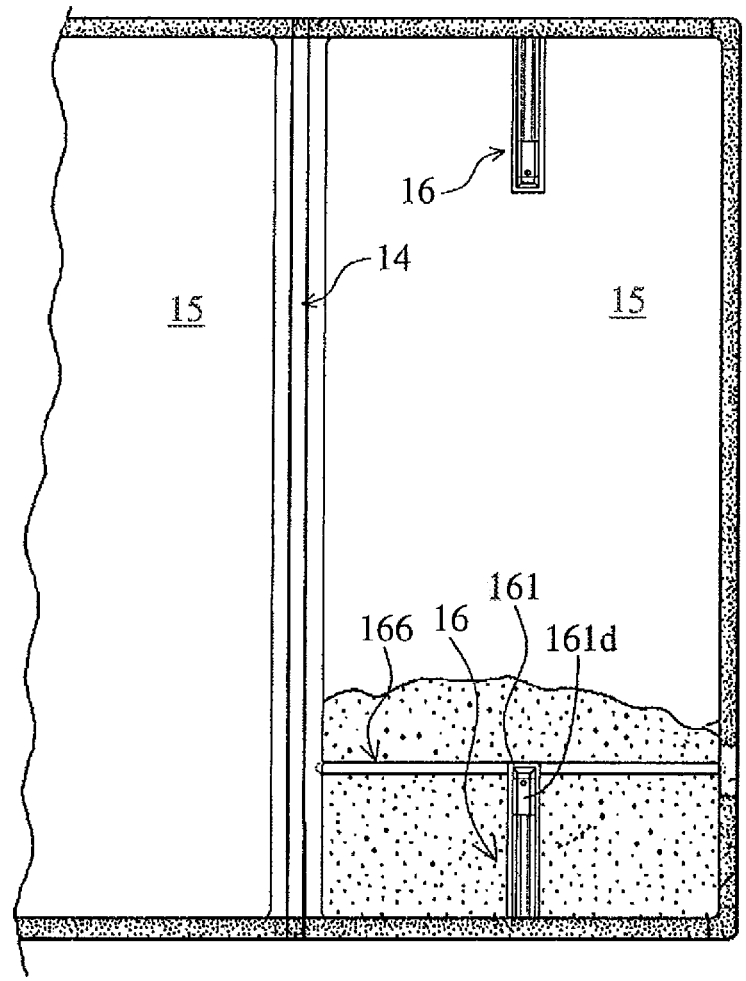
FIG. 2 is a partially enlarged view of the hard-top type traditional foldable tonneau cover system of FIG. 1 in a horizontally extended status.
Figure 3:
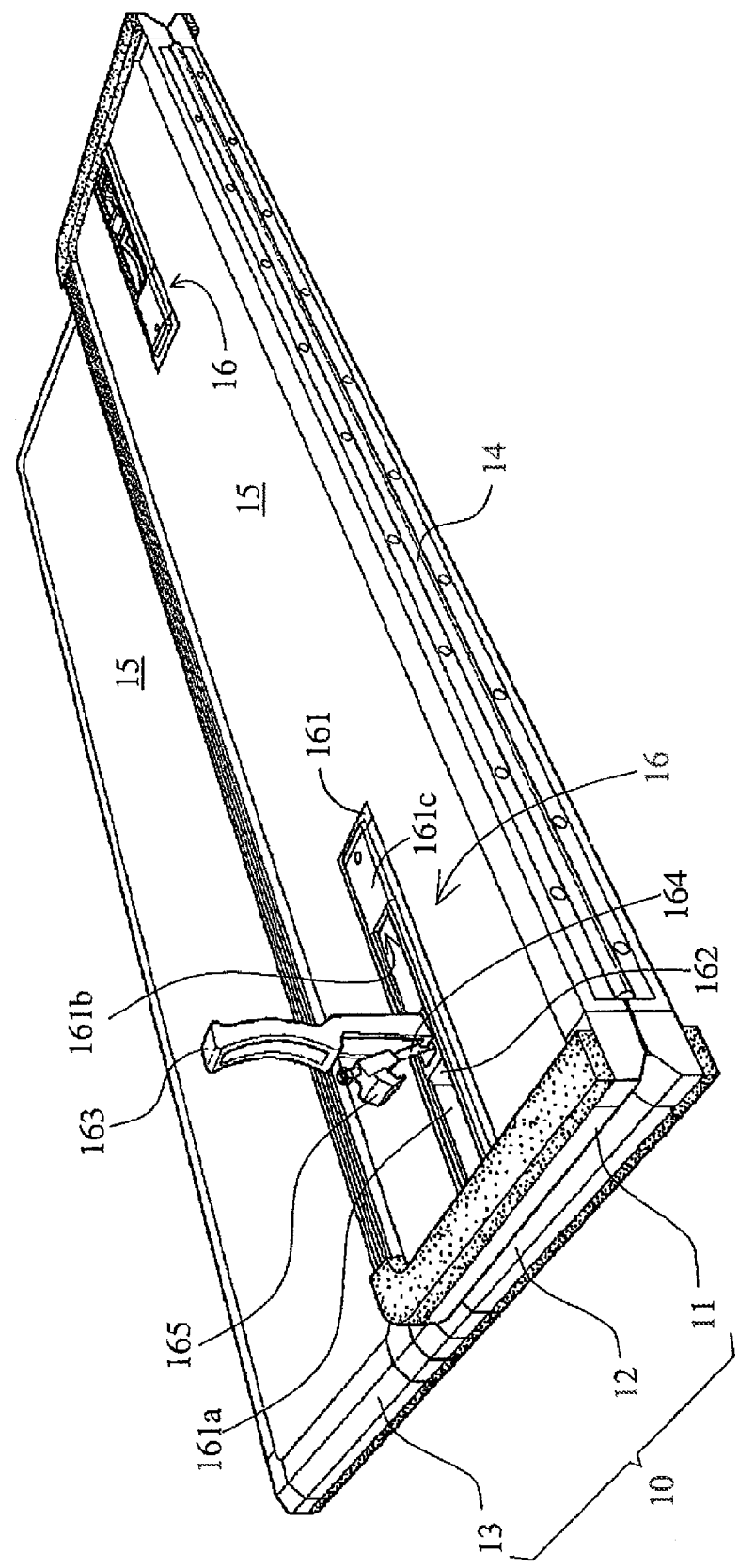
FIG. 3 is a partially enlarged view of the hard-top type traditional foldable tonneau cover system of FIG. 1 in a folded status.
Figure 4:
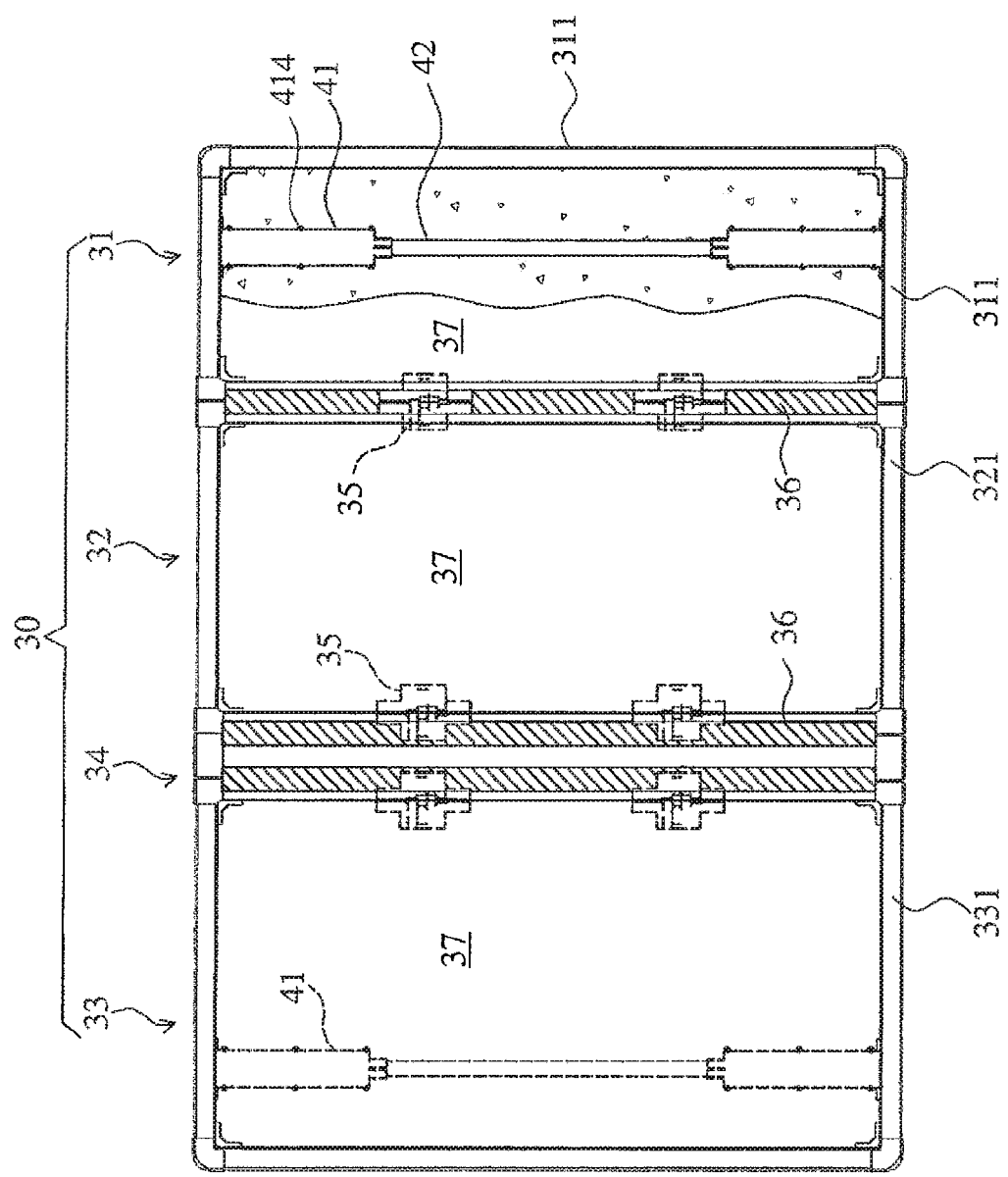
FIG. 4 is a top view of a foldable tonneau cover of a pick-up truck according to a first embodiment of the present invention.
Figure 5:
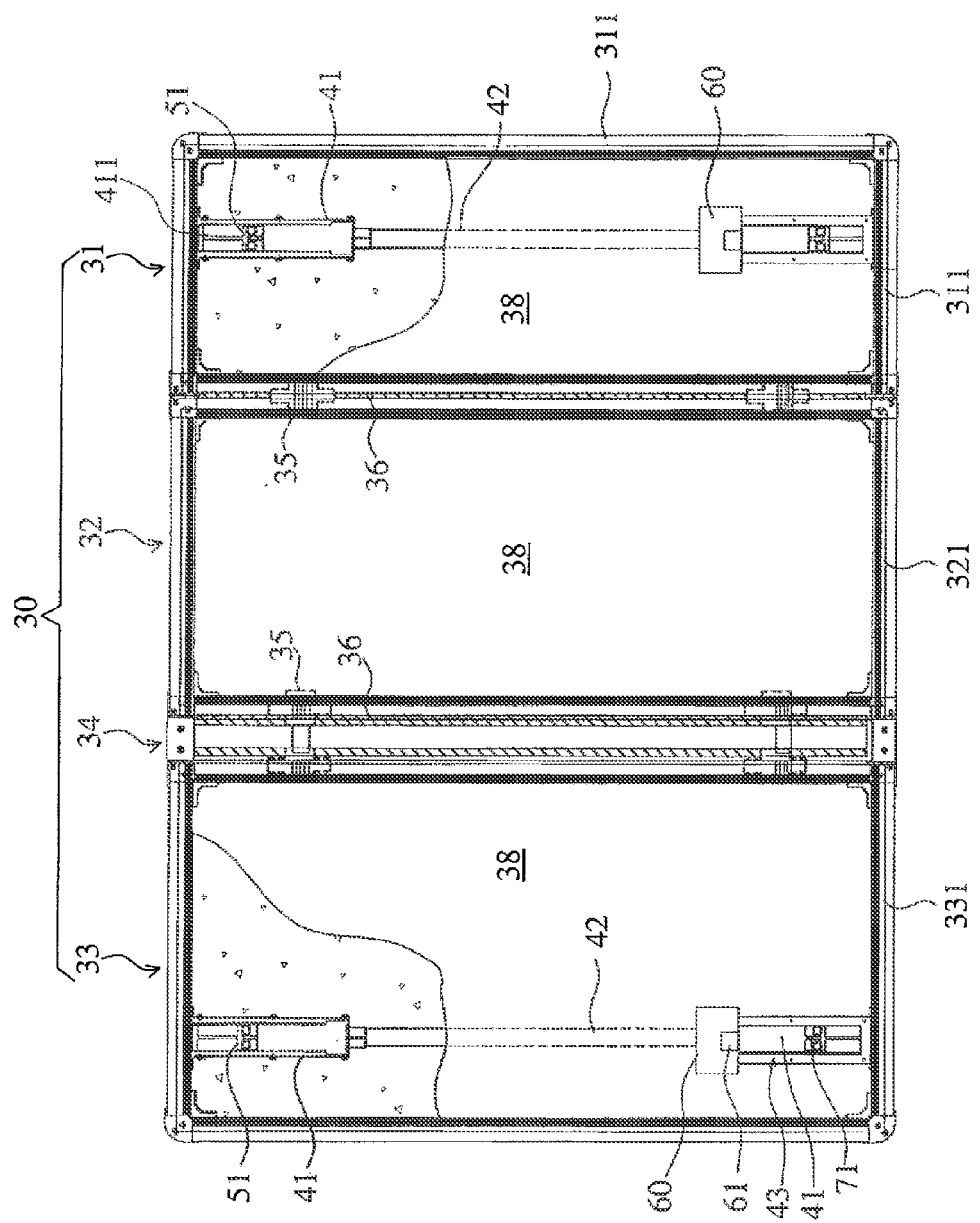
FIG. 5 is a bottom view of the foldable tonneau cover according to the first embodiment of the present invention.
Figure 12:
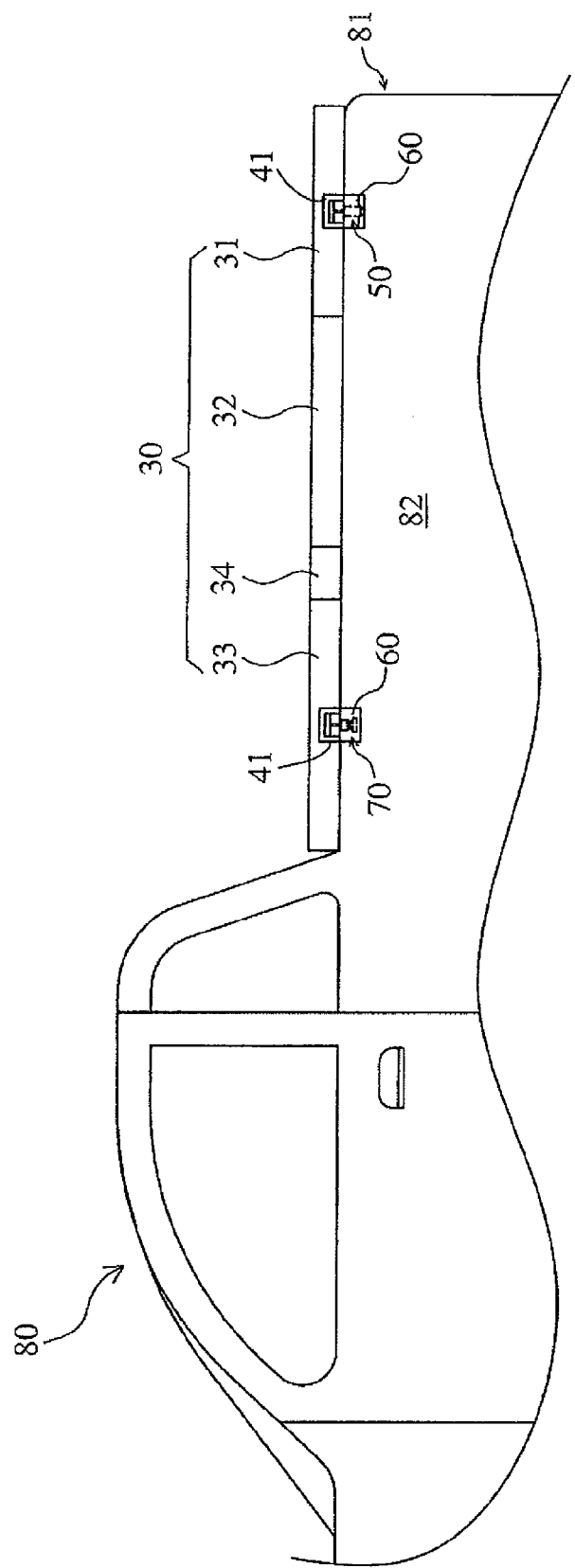
FIG. 12 is a schematic view of the foldable tonneau cover in an extended position according to the first embodiment of the present invention.
Figure 13:
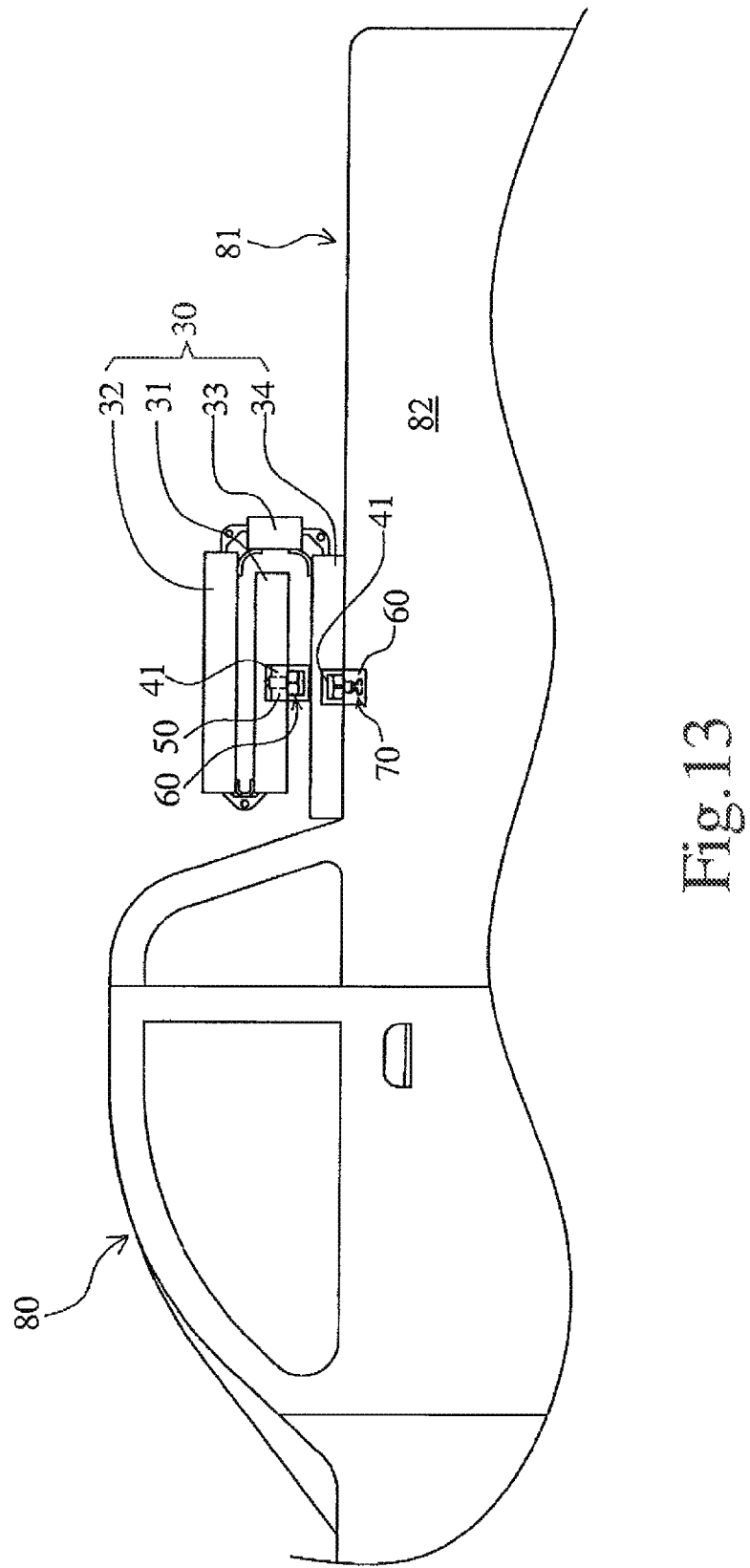
FIG. 13 is a schematic view of the foldable tonneau cover in a folded position according to the first embodiment of the present invention.

Referring now to FIGS. 4 and 5, top and bottom views of a foldable tonneau cover for a pick-up truck according to a first embodiment of the present invention are illustrated. As shown, the foldable tonneau cover designated by numeral 30 is applied to a pick-up truck 80 (as shown in FIGS. 12-13) and comprises at least two frame sections 31-33, a spacer rail 34, a plurality of hidden-type hidden hinges 35, a plurality of waterproof flexible strips 36, at least two upper rigid covers 37 and at least two lower rigid covers 38, at least two pairs of track rails 41, at least two interconnection rails 42, at least two pairs of annular lids 43, a pair of rear clamp assemblies 50, two pair of cushion members 60, and a pair of front clamp assemblies 70, all of which will be described in more detailed hereinafter.

Referring to FIGS. 4 and 5, the number of the frame sections 31-33 can be two, three, four, or more. In the embodiment, the foldable tonneau cover 30 is provided with a first frame section 31 (i.e. a rearmost frame section), a second frame section 32 (i.e. an intermediate frame section) and a third frame section 33 (i.e. a frontmost frame section), but is not limited to include additional frame sections. Further, the spacer rail 34 is installed between the second frame section 32 and the third frame section 33 for conveniently folding the three frame sections 31-33. The first frame section 31 has a plurality first frame members 311, one of the upper rigid covers 37, one of the lower rigid covers 38, and a foam core (unlabeled). The number of the first frame members 311 can be four, and can be made of metal (such as aluminum, iron, stainless steel, copper, or alloys thereof) or engineering plastic. Each set of the first frame members 311 can be used to construct a substantially rectangular frame and define a rectangular space within the rectangular frame. The upper and lower rigid covers 37, 38 are made of rigid material, such as engineering plastic (such as polyamide 6 (PA6), polyamide 66 (PA66), polypropylene (PP), acrylonitrile-butadiene-styrene (ABS) copolymer, polycarbonate (PC) or polybutylene terephthalate (PBT), without limitation,) or metal (such as aluminum, iron, stainless steel, copper, or alloys thereof). The upper and lower rigid covers 37, 38 can be suitably covered and fixed on a top side and a bottom side of the first frame members 311, i.e. the first frame members 311 commonly support the upper and lower rigid covers 37, 38. The foam core (such as made of urethane foam material) is filled into the rectangular space within the rectangular frame.

Similarly, the second frame section 32 also has a plurality second frame members 321, one of the upper rigid covers 37, one of the lower rigid covers 38, and a foam core (not-shown), while the third frame section 33 also has a plurality third frame members 331, one of the upper rigid covers 37, one of the lower rigid covers 38, and a foam core (unlabeled).

Figure 6:
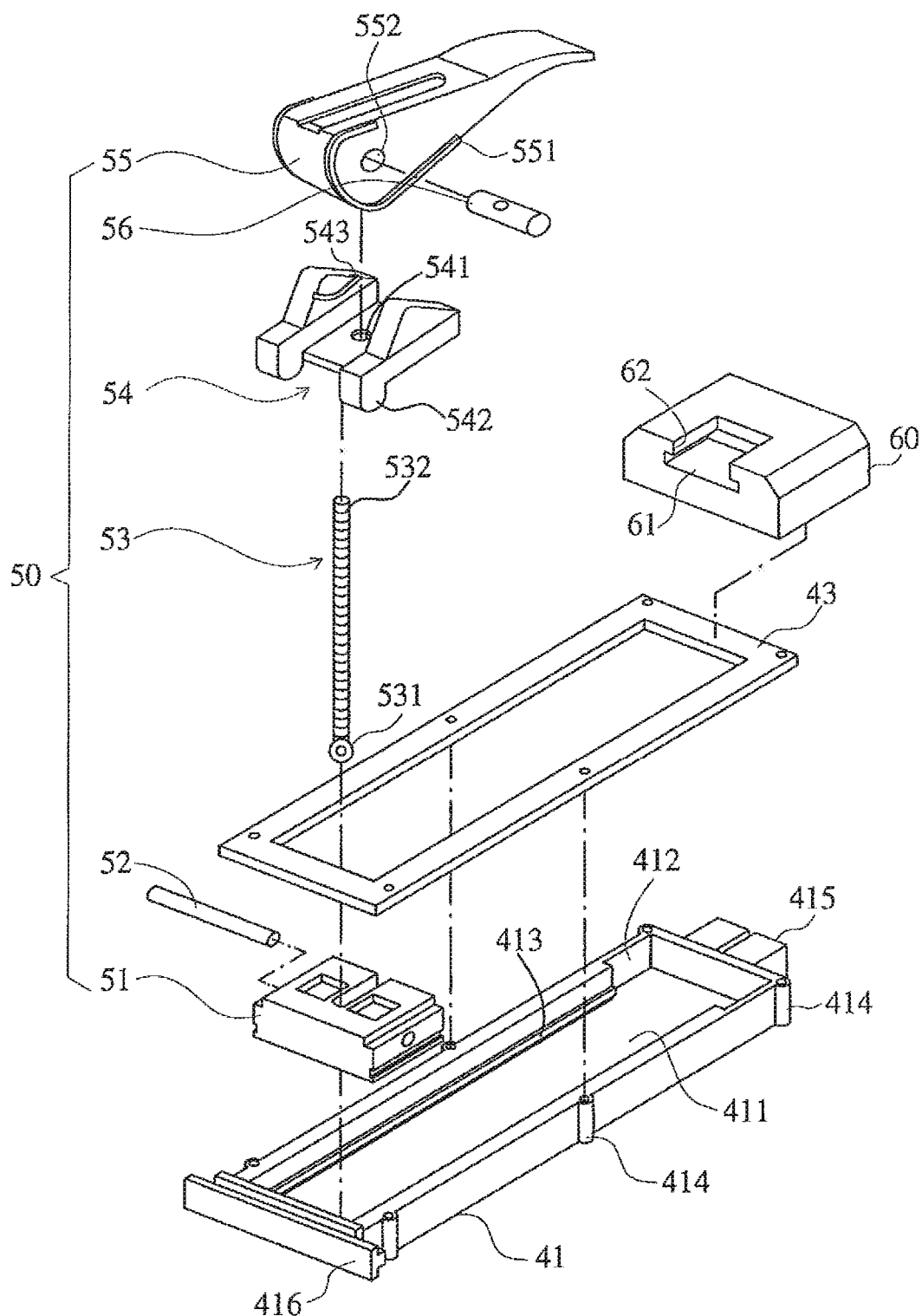
FIG. 6 is a partially enlarged and exploded view of a track rail, a rear clamp assembly and a cushion member according to the first embodiment of the present invention.
Figure 7:
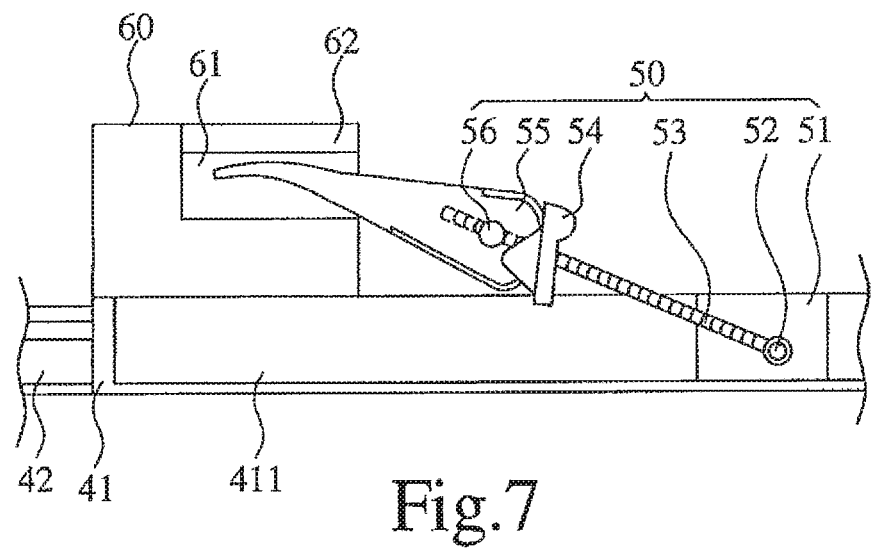
FIG. 7 is a partially enlarged and cross-sectional view of the track rail, the rear clamp assembly and the cushion member according to the first embodiment of the present invention when the rear clamp assembly is in a stored position.
Figure 8:
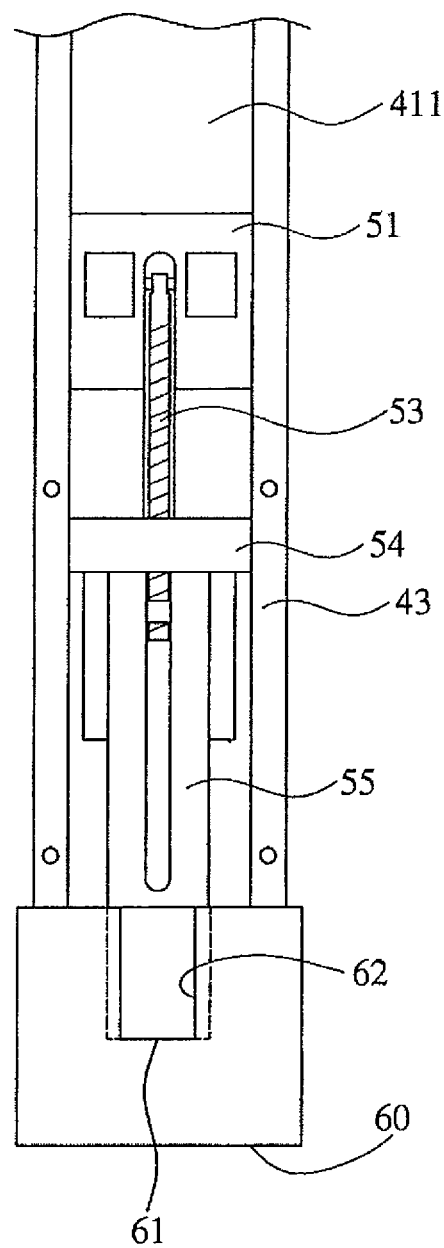
FIG. 8 is a partially enlarged and top view of the track rail, the rear clamp assembly and the cushion member, corresponding to FIG. 7.

Furthermore, referring to FIGS. 4, 5 and 6, a pair of the track rails 41 is installed in the first frame section 31 (i.e. a rearmost frame section), wherein one of the track rails 41 has a proximate end coupled to one of the first frame members 311 and a distal end supported by one end of the interconnection rail 42 which has the other end coupled to a distal end of the other of the track rails 41. Each of the track rails 41 has a track 411, an opening 412, a pair of flanges 413, a plurality of positioning portions 414, an insertion protrusion 415, and a T-shape insertion block 416. The track 411 is formed in and extended along the track rail 41. The opening 412 is formed at a distal end of the track 411, and has a width greater than that of the track 411 for conveniently installing a block member 51 of the rear clamp assembly 50 into the track 411 during installation. The two flanges are protruded from two side edges of the track 411, so as to define an inverted T-shape cross-section of the track 411. Thus, the block member 51 can be slidably disposed in the track 411, but can not be detached from the track 411. The positioning portions 414 are protruded from and formed on two sides of the track rail 41. In this embodiment, the number of the positioning portions 414 is six, and the positioning portions 414 are integrated posts with threaded holes, wherein the annular lid 43 (such as an annular iron plate) has through holes corresponding to the threaded holes of the positioning portions 414, so that the annular lid 43 and the track rail 41 can be fixed on an outer surface and an inner surface of the lower rigid cover 38, respectively, by a plurality of screws (not-shown) screw-connecting through the through holes and the threaded holes. The insertion protrusion 415 is protruded from the distal end of the track rail 41 and used to connect with one end of the interconnection rail 42. The T-shape insertion block 416 is protruded from a proximate end of the track rail 41 and used to connect with one the first frame member 311.

Moreover, the two rear clamp assemblies 50 are slidably installed along the two track rails 41 mounted in the first frame section 31, respectively, and each of the rear clamp assemblies 50 comprises: a block member 51, a pivot 52, a rod member 53, a latch member 54, a handle 55 and a movable pivot 56. The block member 51 is slidably received in the track 411 of the corresponding track rail 41. The pivot 52 is installed in the block member 51. One end of the rod member 53 has a pivotal portion 531 rotatably coupled to the pivot 52, so that the rod member 53 can be pivotally rotated in relation to the block member 51. Meanwhile, the other end of the rod member 53 has a threaded portion 532, wherein the latch member 54 has: a threaded hole 541 movably screw-connected on the threaded portion 532 of the rod member 53, a hook portion 542 to engage with a side wall 83 of a cargo box 82 of the pick-up truck 80 (as shown in FIGS. 12-13), and a pair of guiding grooves 543 facing the handle 55. The handle 55 is a flat lever which has: a pair of cam ribs slidably disposed in the pair of guiding grooves 543, and a pair of through holes 552 into which the movable pivot 56 is inserted. The movable pivot 56 is movable disposed on the threaded portion 532 of the rod member 53, so that the handle 55 can pivotally rotate in relation to the movable pivot 56 and the rod member 53 for the purpose of biasing the latch member 54. Thus, the handle 55 can control the hook portion 542 of the latch member 54 to be switched between a clamped position for operatively engaging with the side wall 83 of the cargo box 82 and a released position for releasing from the side wall 83. The rear clamp assemblies 50 and its clamped and released positions are traditional technologies in the field of the foldable tonneau cover for a pick-up truck, and thus the detailed description thereof will be omitted hereinafter.

Referring to FIGS. 5, 6, 7 and 8, a clamp storage mechanism is provided on the lower rigid cover 38 of the first frame section 31 for each of the rear clamp assemblies 50, wherein the clamp storage mechanism comprises a cushion member 60 mounted on the lower rigid cover 38 of the first frame section 31 and over a distal end of the track rail 41 in the first frame section 31. The cushion member 60 is preferably made of foam rubber, such as ethylene vinyl acetate (EVA) copolymer. The cushion member 60 has a storage notch 61, and an opening of the storage notch 61 has two protruded flanges 62 facing each other to form an inverted T-shape cross-section or a dovetailed cross-section of the storage notch 61 in a longitudinal direction vertical to the lower rigid cover 38. The inverted T-shape or dovetailed cross-section defined by the two protruded flanges 62 causes that a width of the opening of the storage notch 61 is smaller than the width of the distal end of the handle 55 (i.e. a flat lever) of the rear clamp assembly 50, so that the inverted T-shape or dovetailed cross-section is useful for tightly positioning the distal end of the handle 55 of the rear clamp assembly 50 when the rear clamp assembly 50 is slidably moved along the track 411 and shifted into a stored position, and able to prevent the distal end of the handle 55 from disengaging from the storage notch 61 due to vibrations generated during the pick-up truck 80 is still moving if the foldable tonneau cover 30 is in a folded position mounted on a front end of the cargo box 81 (as shown in FIG. 13).

Moreover, in the stored position, the handle 55 and the rod member 53 is substantially linearly aligned with each other, and both of the handle 55 and the rod member 53 are inclined in relation to the lower rigid cover 38 of the first frame section 31 (and the track 411 of the track rail 41), wherein an included angle between the handle 55 (or the rod member 53) and the lower rigid cover 38 is ranged from 5° to 30°, such as 10°, 15°, 20° or 25°. In addition, the entire handle 55 is substantially located outside the track 411; and the height of the latch member 54 (or the entire rear clamp assembly 50) in relation to the lower rigid cover 38 is lower than or equal to the height of the cushion member 60 in relation to the lower rigid cover 38 of the first frame section 31. Thus, when the foldable tonneau cover 30 is in a folded position (as shown in FIG. 13), a surface defining the opening of the storage notch 61 can be used to elastically abut against the upper rigid cover 37 of the third frame section 33 to increase the vibration absorption or prevent from occupying space without being interfered by the protruded handle 55 or latch member 54. Besides, in the embodiment, the length of the track 411 of the track rail 41 can be preferably designed to be smaller than the length from the distal end of the handle 55 to the pivotal end 531 of the rod member 53 pivotally connected to the block member 51, while the cushion member 60 is mounted over the distal end of the track 411 of the track rail 41. Thus, it is convenient for smoothly placing the distal end of the handle 55 of the rear clamp assembly 50 into the storage notch 61 of the cushion member 60, and can prevent the distal end of the handle 55 from entering the track 411 of the track rail 41 and causing inconveniently pulling the handle 55 out of the track 411. Meanwhile, because the cutting length of the lower rigid cover 38 is reduced, it also can avoid from affecting the entire strength of the lower rigid cover 38.

Figure 9:
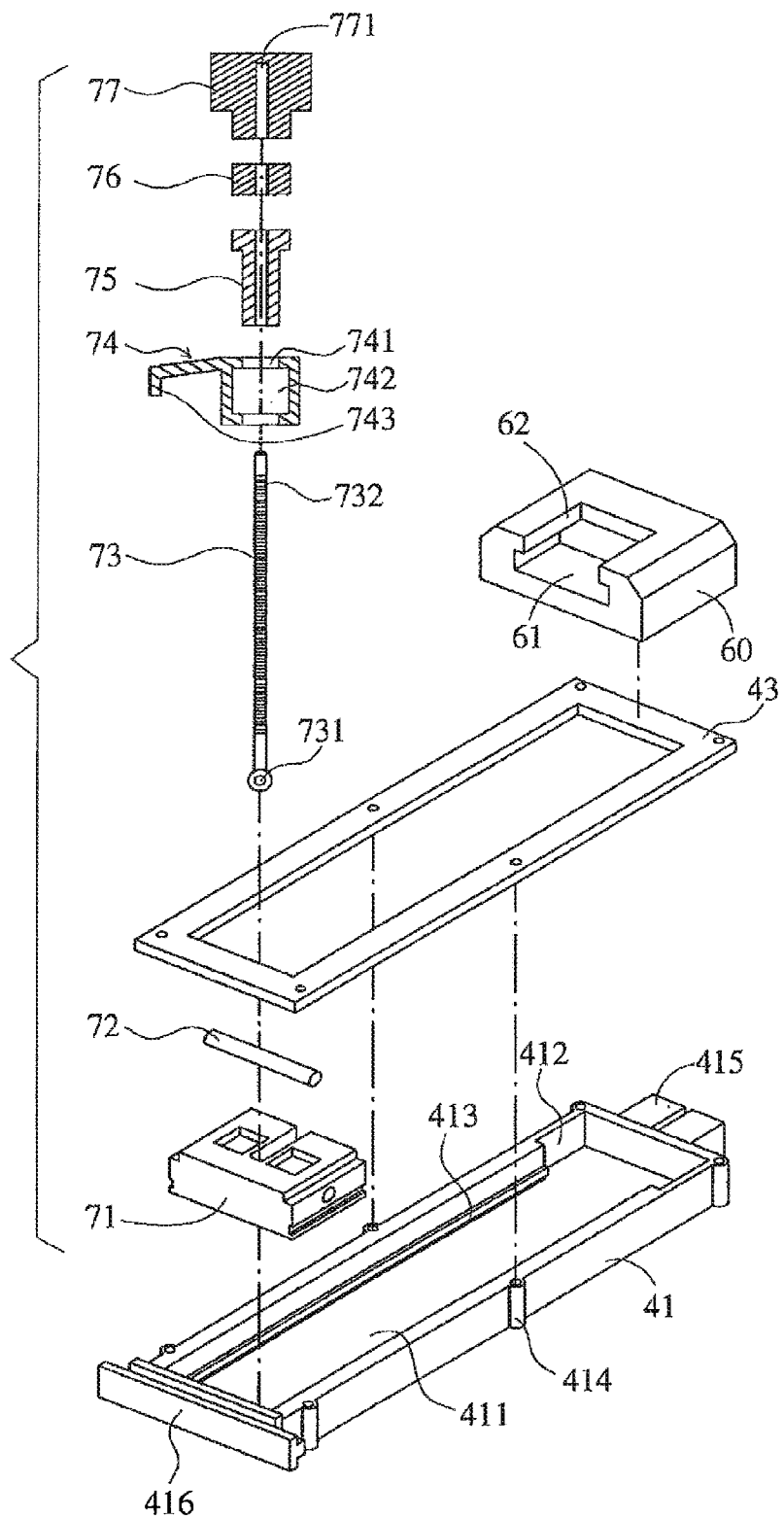
FIG. 9 is a partially enlarged and exploded view of a track rail, a front clamp assembly and a cushion member according to the first embodiment of the present invention.
Figure 10:
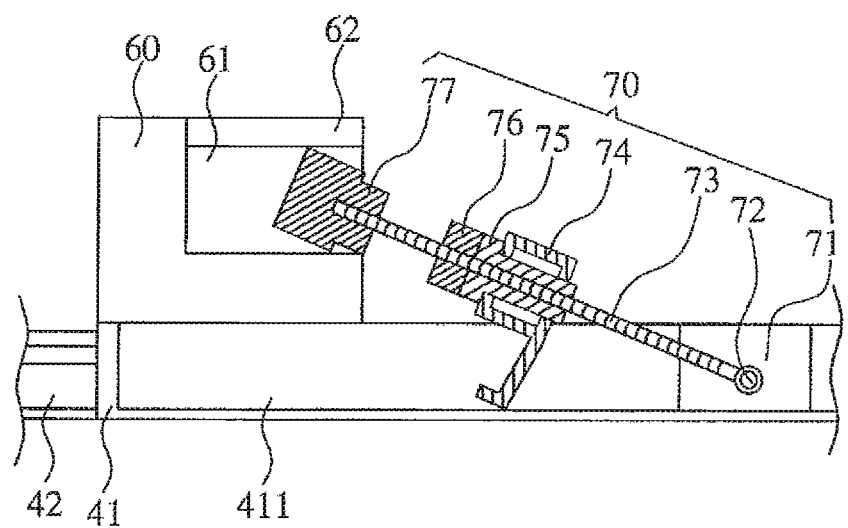
FIG. 10 is a partially enlarged and cross-sectional view of the track rail, the front clamp assembly and the cushion member according to the first embodiment of the present invention when the front clamp assembly is in a stored position.
Figure 11:
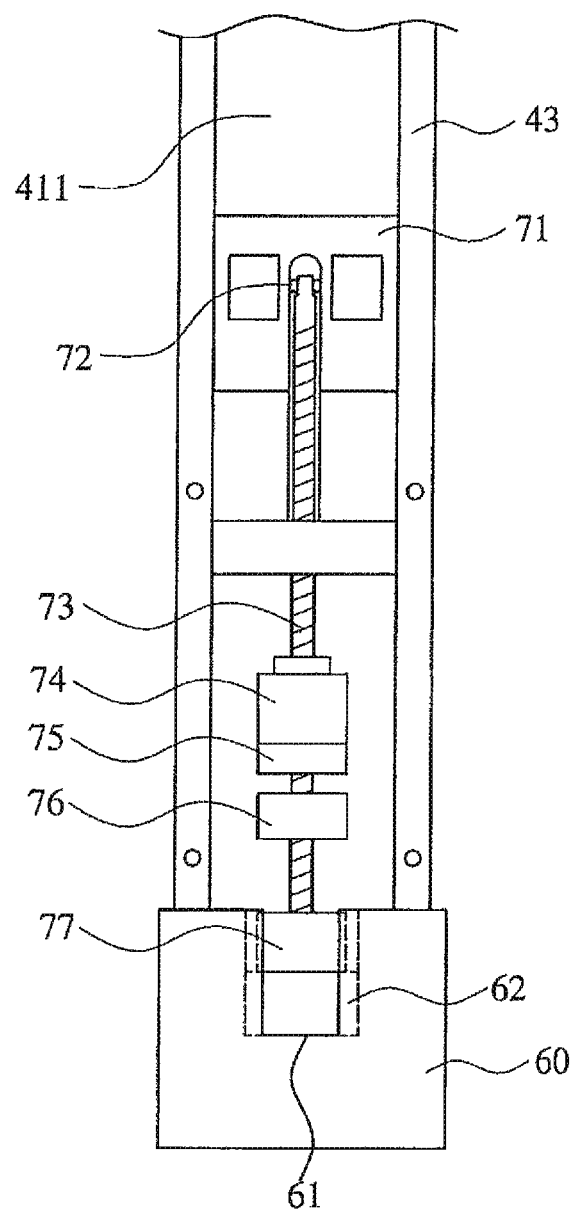
FIG. 11 is a partially enlarged and top view of the track rail, the front clamp assembly and the cushion member, corresponding to FIG. 10.

Similarly, referring to FIGS. 4, 5 and 9, a pair of the track rails 41 is installed in the third frame section 33 (i.e. a frontmost frame section), wherein one of the track rails 41 has a proximate end coupled to one of the third frame members 331 and a distal end supported by one end of the interconnection rail 42 which has the other end coupled to a distal end of the other of the track rails 41. Each of the track rails 41 has a track 411, an opening 412, a pair of flanges 413, a plurality of positioning portions 414, an insertion protrusion 415, and a T-shape insertion block 416. The track 411 is formed in and extended along the track rail 41. The opening 412 is formed at a distal end of the track 411, and has a width greater than that of the track 411 for conveniently installing a block member 71 of the front clamp assembly 70 into the track 411 during installation. The two flanges are protruded from two side edges of the track 411, so as to define an inverted T-shape cross-section of the track 411. Thus, the block member 71 can be slidably disposed in the track 411, but can not be detached from the track 411. The positioning portions 414 are protruded from and formed on two sides of the track rail 41. In this embodiment, the number of the positioning portions 414 is six, and the positioning portions 414 are integrated posts with threaded holes, wherein the annular lid 43 (such as an annular iron plate) has through holes corresponding to the threaded holes of the positioning portions 414, so that the annular lid 43 and the track rail 41 can be fixed on an outer surface and an inner surface of the lower rigid cover 38, respectively, by a plurality of screws (not-shown) screw-connecting through the through holes and the threaded holes. The insertion protrusion 415 is protruded from the distal end of the track rail 41 and used to connect with one end of the interconnection rail 42. The T-shape insertion block 416 is protruded from a proximate end of the track rail 41 and used to connect with one the third frame member 331.

Moreover, the two front clamp assemblies 70 are slidably installed along the two track rails 41 mounted in the third frame section 33, respectively, and each of the front clamp assemblies 70 comprises: a block member 71, a pivot 72, a rod member 73, a latch member 74, at least one plastic sleeve 75,76 and a handle 77. The block member 71 is slidably received in the track 411 of the corresponding track rail 41. The pivot 72 is installed in the block member 71. One end of the rod member 73 has a pivotal portion 733 rotatably coupled to the pivot 72, so that the rod member 73 can be pivotally rotated in relation to the block member 71. Meanwhile, the other end of the rod member 73 has a threaded portion 732, wherein the latch member 74 is made of rigid metal or alloy, such as aluminum or aluminum-based alloy, and the latch member 74 has: a through hole 741 through which the plastic sleeve 75 passes, a hollow portion 742 formed in the latch member 74 to provide a certain slightly elastically deformable property to the latch member 74, and a hook portion 743 to engage with a side wall 83 of a cargo box 82 of the pick-up truck 80 (as shown in FIGS. 12-13). The two plastic sleeves 75,76 are sleeved on the threaded portion 732 of the rod member 73 in turn, and the plastic sleeve 75 passes the through hole 741 of the latch member 74 and tightly combined with the through hole 741. Thus, the two plastic sleeves 75,76 can prevent the latch member 74 made of metal from being directly in contact with the handle 77 and the block member 71 to cause noise or surface abrasion. The handle 77 is a turnbutton which has: a threaded hole 571 which is screw-connected to the threaded portion 732 of the rod member 73, so that the handle 77 can horizontally and pivotally rotate in relation to the rod member 73 for the purpose of biasing the latch member 74 or disengaging from the latch member 74. Thus, the handle 77 can control the hook portion 743 of the latch member 74 to be switched between a clamped position for operatively engaging with the side wall 83 of the cargo box 82 and a released position for releasing from the side wall 83. The front clamp assemblies 70 and its clamped and released positions are traditional technologies in the field of the foldable tonneau cover for a pick-up truck, and thus the detailed description thereof will be omitted hereinafter.

Referring to FIGS. 5, 9, 10 and 11, a clamp storage mechanism is also provided on the lower rigid cover 38 of the third frame section 33 for each of the front clamp assemblies 70, wherein the clamp storage mechanism comprises a cushion member 60 mounted on the lower rigid cover 38 of the third frame section 33 and over a distal end of the track rail 41 in the third frame section 33. The cushion member 60 is preferably made of foam rubber, such as ethylene vinyl acetate (EVA) copolymer. The cushion member 60 has a storage notch 61, and an opening of the storage notch 61 has two protruded flanges 62 facing each other to form an inverted T-shape cross-section or a dovetailed cross-section of the storage notch 61 in a longitudinal direction vertical to the lower rigid cover 38. The inverted T-shape or dovetailed cross-section defined by the two protruded flanges 62 causes that a width of the opening of the storage notch 61 is smaller than the maximum width of the handle 77 (i.e. a turnbutton) of the front clamp assembly 70, so that the inverted T-shape or dovetailed cross-section is useful for tightly positioning the handle 77 of the front clamp assembly 70 when the front clamp assembly 70 is slidably moved along the track 411 and shifted into a stored position, and able to prevent the handle 77 from disengaging from the storage notch 61 if the foldable tonneau cover 30 is in a folded position and entirely detached from the cargo box 81 (not-shown).

Moreover, in the stored position, the handle 77 (i.e. a turnbutton) and the rod member 73 is substantially linearly aligned with each other, and both of the handle 77 and the rod member 73 are inclined in relation to the lower rigid cover 38 of the third frame section 33 (and the track 411 of the track rail 41), wherein an included angle between the handle 77 (or the rod member 73) and the lower rigid cover 38 is ranged from 5° to 30°, such as 10°, 15°, 20° or 25°. In addition, the entire handle 77 is substantially located outside the track 411; and the height of the latch member 74 (or the entire front clamp assembly 70) in relation to the lower rigid cover 38 is lower than or equal to the height of the cushion member 60 in relation to the lower rigid cover 38 of the third frame section 33. Thus, when the foldable tonneau cover 30 is in a folded position, entirely detached from the cargo box 81 and placed on the ground or the bottom of the cargo box 81 with the front clamp assembly 70 and its cushion member 60 facing upward (not-shown), a surface defining the opening of the storage notch 61 can be used to elastically abut against something stacked on the folded foldable tonneau cover 30 to increase the vibration absorption or prevent from occupying space without being interfered by the protruded handle 55 or latch member 54. Besides, in the embodiment, the length of the track 411 of the track rail 41 can be preferably designed to be smaller than the length from the distal end of the handle 77 to the pivotal end 733 of the rod member 73 pivotally connected to the block member 71, while the cushion member 60 is mounted over the distal end of the track 411 of the track rail 41. Thus, it is convenient for smoothly placing the distal end of the handle 77 of the front clamp assembly 70 into the storage notch 61 of the cushion member 60, and can prevent the distal end of the handle 77 from entering the track 411 of the track rail 41 and causing inconveniently pulling the handle 77 out of the track 411. Meanwhile, because the cutting length of the lower rigid cover 38 is reduced, it also can avoid from affecting the entire strength of the lower rigid cover 38.

Referring now to FIGS. 12 and 13, schematic view of the foldable tonneau cover 30 in an extended position and a folded position according to the first embodiment of the present invention are illustrated, respectively. The first frame section 31 (i.e. rearmost frame section), the second frame section 32 (i.e. intermediate frame section) and the third frame section 33 (i.e. frontmost frame section) can be adjusted to the extended position or the folded position according to the user's desire. When the frame sections 31-33 are in the extended position as shown in FIG. 12, the frame sections 31-33 are horizontally extended on the two side walls 82 of the cargo box 81 of the pick-up truck 80, and fixed thereon by a pair of the rear clamp assemblies 50 and a pair of the front clamp assemblies 70, so as to cover an inner space of the cargo box 81. When the frame sections 31-33 are converted into the folded position as shown in FIG. 13, the frame sections 31-33 are folded and stacked on a front end of the two side walls 82, so as to expose the inner space of the cargo box 81 for placing or taking cargo. In the embodiment, the inverted T-shape or dovetailed cross-section of the storage notch 61 is useful for tightly positioning the distal end of the handle 55 of the rear clamp assembly 50 when the rear clamp assembly 50 is slidably moved along the track 411 and shifted into a stored position, and able to prevent the distal end of the handle 55 from disengaging from the storage notch 61 due to vibrations generated during the pick-up truck 80 is still moving and the foldable tonneau cover 30 is already in the folded position mounted on the front end of the cargo box 81. Furthermore, the height of the cushion member 60 in relation to the lower rigid cover 38 is substantially equal to the gap/distance between the first frame section 31 (i.e. rearmost frame section) and the third frame section 33 (i.e. frontmost frame section) of the foldable tonneau cover 30 when the foldable tonneau cover 30 is in a folded position. Thus, the cushion member 60 mounted on first frame section 31 also can elastically abut against the upper rigid cover 37 of the third frame section 33, so as to absorb vibrations generated during the pick-up truck 80 is still moving.

Figure 14:
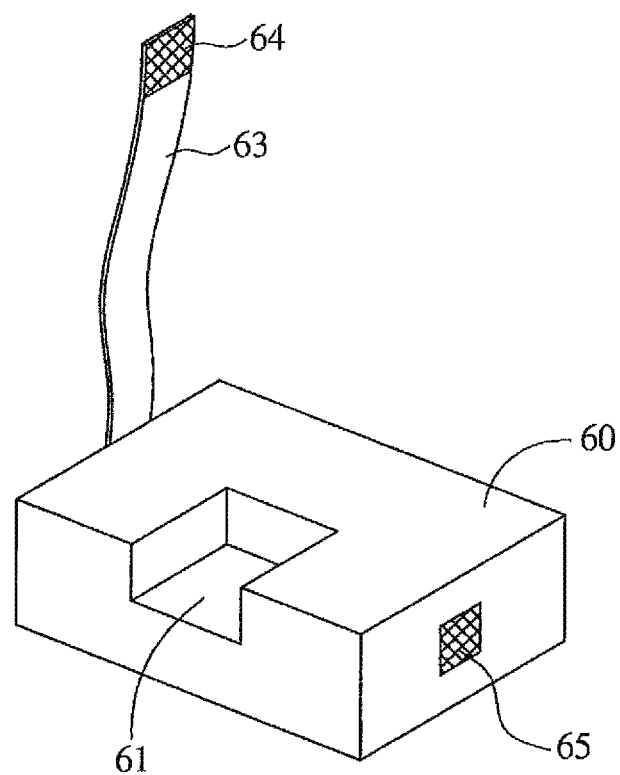
FIG. 14 is a schematic view of a cushion member according to a second embodiment of the present invention.

Referring now to FIG. 14, a schematic view of a cushion member 60 according to a second embodiment of the present invention is illustrated, wherein the cushion member 60 of the second embodiment can be used to store the handle 55 of the rear clamp assembly 50 or the handle 77 of the front clamp assembly 70 in the first embodiment. The structural difference between the second embodiment and the first embodiment is that: the cushion member 60 of the second embodiment also has a storage notch 61, but has no the two protruded flanges 62 to form an inverted T-shape or dovetailed cross-section. However, the cushion member 60 of the second embodiment includes a fastening belt 63 having a first end mounted on one side (i.e. a left or right side) of the cushion member 60 and a second end 64 spanning across the storage notch 61 to engage with a fastening member 65 mounted on the other side (i.e. a right or left side) of the cushion member 60, so that the handle 55/77 also can be retained in the storage notch 61. In the embodiment, the second end 64 of the fastening belt 63 is provided with one of a hook fastener and a loop fastener, while the fastening member 65 is the other of the hook fastener and the loop fastener. Alternatively, the second end 64 of the fastening belt 63 is provided with one of a male snap button and a female snap button, while the fastening member 65 is the other of the male snap button and the female snap button.

Figure 15:
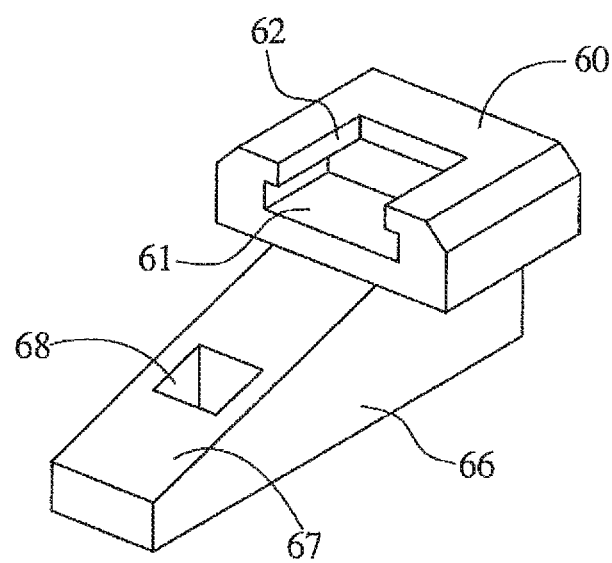
FIG. 15 is a schematic view of a cushion member according to a third embodiment of the present invention.

Referring now to FIG. 15, a schematic view of a cushion member 60 according to a third embodiment of the present invention is illustrated, wherein the cushion member 60 of the third embodiment can be used to store the handle 77 and the latch member 74 of the front clamp assembly 70 in the first embodiment. The structural difference between the second embodiment and the first embodiment is that: the cushion member 60 of the third embodiment further has an extension portion 66 extended from a mainbody of the cushion member 60, and the extension portion 66 is used to insert into the distal end of the track 411 of the track rail 41. The extension portion 66 has an inclined surface 67 and an indentation 68 formed in the inclined surface 67, wherein the inclined surface 67 is inclined in relation to the bottom of the track 411, and the incline angle of the inclined surface 67 is corresponding to the included angle between the handle 77 (or the rod member 73) and the lower rigid cover 38, i.e. the incline angle of the inclined surface 67 is ranged from 5° to 30°, such as 10°, 15°, 20° or 25°. The indentation 68 is a blind hole for receiving hook portion 743 of the latch member 74, while the indentation 68 can also has two protruded flanges (not-shown) to provide a positioning and retaining function. Thus, when the front clamp assembly 70 is shifted into the stored position, the hook portion 743 of the latch member 74 can be partially or completely received and retained in the indentation 68, so as to prevent the hook portion 743 from being shaken and causing noise or surface abrasion when the front clamp assembly 70 is in a stored position.

As described above, in comparison with the traditional clamp assembly stored in the pocket track located at the distal end of the channel of the clamp track, the foldable tonneau cover 30 of the present invention as shown in FIGS. 4 to 13 is provided with at least one clamp storage mechanism each having a cushion member 60 mounted on a lower rigid cover 38 of a frame section 31, 33 and over a distal end of a track rail 41, wherein the cushion member 60 has a storage notch 61 for at least partially receiving a handle 55/77 of a rear/front clamp assembly 50/70 when the rear/front clamp assembly 50/70 is shifted into a stored position. In the stored position, the handle 55/77 is inclined in relation to the lower rigid cover 38, and the handle 55/77 is located outside the track of the track rail 41. Thus, the convenience to manually operate the handle 55/77 can be enhanced, the vibration during the pick-up truck 80 is moving can be absorbed, the handle 55/77 can be tightly positioned in the storage notch 61, and the entire strength of the lower rigid cover 38 can be ensured.

The present invention has been described with a preferred embodiment thereof and it is understood that many changes and modifications to the described embodiment can be carried out without departing from the scope and the spirit of the invention that is intended to be limited only by the appended claims.

What is claimed is:

1. A foldable tonneau cover for a pick-up truck, comprising:
    a frame section having a plurality of frame members commonly supporting an upper rigid cover and a lower rigid cover;
    a pair of track rails each defining a track, wherein one of the track rails has a proximate end coupled to one of the frame members and a distal end supported by one end of an interconnection rail which has the other end coupled to a distal end of the other of the track rails; and
    a pair of clamp assemblies slidably installed along the track rails, respectively, and each of the clamp assemblies comprising:
        a block member slidably received in the track of the corresponding track rail,
        a rod member rotatably coupled to the block member,
        a latch member slidably coupled to the rod member and switched between a clamped position for operatively engaging with a side wall of a cargo box of the pick-up truck and a released position for releasing from the side wall of the cargo box; and
        a handle rotatably coupled to the rod member for controlling the latch member to switch between the clamped position and the released position;
    a pair of cushion members mounted on the lower rigid cover of the frame section and over the distal ends of the track rails, respectively, and each having a storage notch for positioning the handle when the clamp assembly is shifted into a stored position;
    wherein when the clamp assembly is in the stored position, the handle is inclined in relation to the lower rigid cover of the frame section; the handle is substantially located outside the track of the track rail; and the height of the latch member in relation to the lower rigid cover is lower than or equal to the height of the cushion member in relation to the lower rigid cover.

2. The foldable tonneau cover according to claim 1, wherein the cushion member is made of foam rubber.

3. The foldable tonneau cover according to claim 2, wherein the foam rubber is ethylene vinyl acetate (EVA) copolymer.

4. The foldable tonneau cover according to claim 1, wherein the storage notch of the cushion member has an inverted T-shape cross-section or a dovetailed cross-section.

5. The foldable tonneau cover according to claim 1, wherein the cushion member has a fastening belt having a first end mounted on one side of the cushion member and a second end spanning across the storage notch to engage with a fastening member mounted on the other side of the cushion member, so that the handle is retained in the storage notch.

6. The foldable tonneau cover according to claim 5, wherein the second end of the fastening belt is provided with one of a hook fastener and a loop fastener, and the fastening member is the other thereof.

7. The foldable tonneau cover according to claim 5, wherein the fastening member is one of a male snap button and a female snap button, and the fastening member is the other thereof.

8. The foldable tonneau cover according to claim 1, wherein the handle is a lever or a turnbutton.

9. The foldable tonneau cover according to claim 1, wherein the cushion member has an extension portion extended therefrom to insert into the distal end of the track of the track rail.

10. The foldable tonneau cover according to claim 9, wherein the extension portion has an inclined surface and an indentation formed in the inclined surface, wherein the latch member is partially received and retained in the indentation when the clamp assembly is shifted into the stored position.

11. The foldable tonneau cover according to claim 1, wherein the length of the track of the track rail is smaller than the length from a distal end of the handle to a pivotal end of the rod member pivotally connected to the block member.

12. The foldable tonneau cover according to claim 1, wherein the height of the cushion member in relation to the lower rigid cover is substantially equal to the gap between the frame section and a frontmost frame section of the foldable tonneau cover when the foldable tonneau cover is in a folded position.

13. A clamp storage mechanism of a foldable tonneau cover for a pick-up truck, comprising:
a cushion member mounted on a lower rigid cover of a frame section of the foldable tonneau cover and over a distal end of a track rail in the frame section;
wherein the cushion member has a storage notch for positioning a handle of a clamp assembly slidably installed along a track of the track rail when the clamp assembly is shifted into a stored position.

14. The clamp storage mechanism according to claim 13, wherein the cushion member is made of foam rubber.

15. The clamp storage mechanism according to claim 13, wherein the storage notch of the cushion member has an inverted T-shape cross-section or a dovetailed cross-section.

16. The clamp storage mechanism according to claim 13, wherein the cushion member has a fastening belt having a first end mounted on one side of the cushion member and a second end spanning across the storage notch to engage with a fastening member mounted on the other side of the cushion member, so that the handle is retained in the storage notch.

17. The clamp storage mechanism according to claim 16, wherein the second end of the fastening belt is provided with one of a hook fastener and a loop fastener, and the fastening member is the other thereof.

18. The clamp storage mechanism according to claim 16, wherein the fastening member is one of a male snap button and a female snap button, and the fastening member is the other thereof.

19. The clamp storage mechanism according to claim 13, wherein the cushion member has an extension portion extended therefrom to insert into the distal end of the track of the track rail.

20. The clamp storage mechanism according to claim 19, wherein the extension portion has an inclined surface and an indentation formed in the inclined surface, wherein the latch member is partially received and retained in the indentation when the clamp assembly is shifted into the stored position.

* * * * *